United States Patent
Thomas et al.

(10) Patent No.: US 12,437,881 B1
(45) Date of Patent: Oct. 7, 2025

(54) USE OF REMOTE VIRTUAL SCREENING OF PATIENTS WITH ARTIFICIAL INTELLIGENCE (AI) AND MACHINE LEARNING (ML) CAPABILITY FOR INITIAL SCREENING OF THE PATIENTS FOR IMPROVING THE EFFICIENCY OF MEDICAL DIAGNOSIS AND GENERATION OF TREATMENT PLANS

(71) Applicants: Mammen Thomas, Seattle, WA (US); Arun Mammen Thomas, Doublin, CA (US)

(72) Inventors: Mammen Thomas, Seattle, WA (US); Arun Mammen Thomas, Doublin, CA (US)

( * ) Notice: Subject to any disclaimer, the term of this patent is extended or adjusted under 35 U.S.C. 154(b) by 0 days.

(21) Appl. No.: 18/930,973

(22) Filed: Oct. 29, 2024

(51) Int. Cl.
*G16H 80/00* (2018.01)
*G06F 40/58* (2020.01)
*G06T 17/00* (2006.01)
*G16H 10/20* (2018.01)
*G16H 50/20* (2018.01)

(52) U.S. Cl.
CPC ............ *G16H 80/00* (2018.01); *G06F 40/58* (2020.01); *G06T 17/00* (2013.01); *G16H 10/20* (2018.01); *G16H 50/20* (2018.01)

(58) Field of Classification Search
CPC ........ G16H 80/00; G16H 10/20; G16H 50/20; G06F 40/58; G06T 17/00
See application file for complete search history.

(56) References Cited

U.S. PATENT DOCUMENTS

| | | | |
|---|---|---|---|
| 2007/0040889 A1* | 2/2007 | Sahashi | G06Q 30/02 348/14.01 |
| 2011/0072367 A1* | 3/2011 | Bauer | G06F 3/04815 715/757 |
| 2011/0106557 A1* | 5/2011 | Gazula | G06Q 10/10 715/740 |

(Continued)

FOREIGN PATENT DOCUMENTS

| | | | | |
|---|---|---|---|---|
| WO | WO-2020068681 A1 * | 4/2020 | | A61B 34/10 |
| WO | WO-2022051269 A1 * | 3/2022 | | G16H 80/00 |

OTHER PUBLICATIONS

Terry, Virtual Visits Patients seek digital connections, Apr. 10, 2017, Medical Economics, pp. 10-38. (Year: 2017).*

(Continued)

*Primary Examiner* — Christopher L Gilligan

(57) ABSTRACT

A method and process for providing virtual screening of patients and medical personal implemented as a virtual universe in metaverse, typically with the help of a remote system having Artificial Intelligence with machine learning capability, for collection and presentation of patient's medical data is provided. Currently Doctors conduct virtual visits with patients to help collect patient's medical data and establish initial diagnosis. This is a time taking process and takes up a lot of the physician's and their assistant's valuable time and energy. Using the remote system to do the initial screening and collection of patients medical data for presentation to the physician before the virtual visit, will reduce the time physicians need to spend with the patient to arrive at a diagnosis. The capability will also help a physician to guide an assistant at a remote location to collect additional data of the patient.

5 Claims, 4 Drawing Sheets

(56) References Cited

U.S. PATENT DOCUMENTS

| | | | | |
|---|---|---|---|---|
| 2021/0287800 | A1* | 9/2021 | Ghosh | G16H 10/60 |
| 2022/0240779 | A1* | 8/2022 | Peyman | A61B 5/0066 |
| 2023/0270389 | A1* | 8/2023 | Randall | A61B 5/0022 |
| | | | | 600/586 |
| 2023/0385011 | A1* | 11/2023 | Shimizu | H04N 7/157 |
| 2024/0331820 | A1* | 10/2024 | Burger | G16H 50/70 |

OTHER PUBLICATIONS

Bansal et al., Healthcare in Metaverse: A Survey on Current Metaverse Applications in Healthcare, Nov. 17, 2022, IEEE Access, vol. 10, pp. 119914-119946. (Year: 2022).*

* cited by examiner

USE OF REMOTE VIRTUAL SCREENING OF PATIENTS WITH ARTIFICIAL INTELLIGENCE (AI) AND MACHINE LEARNING (ML) CAPABILITY FOR INITIAL SCREENING OF THE PATIENTS FOR IMPROVING THE EFFICIENCY OF MEDICAL DIAGNOSIS AND GENERATION OF TREATMENT PLANS

FIELD OF INVENTION

The invention relates to improving interaction between a patient at remote location and a medical team for diagnosis and identification of treatment options, especially the screening of patients in remote locations using the capabilities of Artificial intelligence, Machine learning with natural language recognition connecting to medical teams as avatars, using preferably three dimensional (3-D) virtual image of patients preferably implemented as a virtual universe in metaverse, where the initial screening of a patient can be done by the AI using natural language.

SUMMARY

Figure 1:
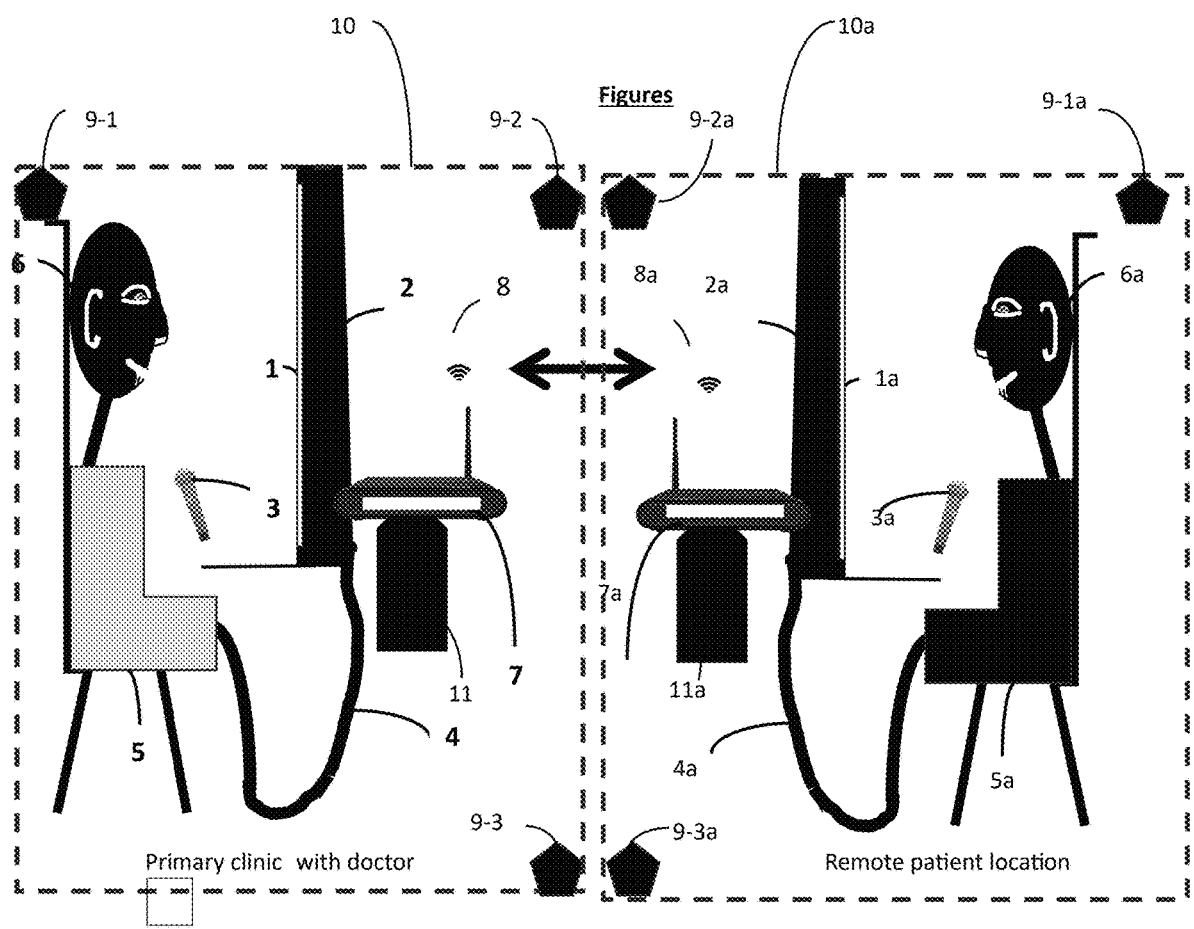
FIG. 1, (100) is a depiction of an embodiment of a system of the present invention enabling a Primary clinic doctor interacting with a patient at remote site over internet using 3-D image on screen or within a virtual reality environment.

Embodiments of the invention provide for a system for allowing interaction between a doctor and a patient at a remote location, the system comprising a capability to generate 3-D image data of a doctor's office and a 3-D image data of a remote patient location using sensors, wherein the generated image data are used to create a 3-D projection or a virtual environment of metaverse enabling the interaction of the doctor and the patient.

Embodiments of the invention provide for a system where the patient and doctor are able to communicate with each other over the internet or within the virtual environment of metaverse.

Embodiments of the invention are directed to interacting with a patient at a remote location using a system capable of receiving natural language inputs and converting that to a medically understandable language using external conversational data inputs and stored language inputs into a language understanding system which has an in-built artificial intelligence (AI) and a machine learning (ML) capability to provide the natural language understanding and conversion capability.

The system uses artificial Intelligence (AI) with ML capability to generate relevant questions to extract from the patient data needed to arrive at an understanding of the patient's problem.

The system saves the list of questions and answers in a database for enhancing the machine learning capability of the system and to use with the artificial intelligence to enable the system to optimize future interactions with patients.

The system creates a clinical knowledge database that is generated and continually updated from various medical sources external to the system.

The system uses the clinical knowledge database with the patients answers and the saved answers to arrive at an initial diagnosis for the patient using an AI based Automatic diagnosis unit.

The AI based automatic diagnosis unit also generates an initial treatment plan for the patient based on the initial diagnosis and input from the clinical knowledge database.

Once the initial assessment, comprising initial diagnosis and initial treatment plan, is done the system sends the diagnosis and treatment plan over a communication channel to doctors at a primary clinic for review and further action.

The system implemented with sensors covering the patient's room at the remote location and the doctor's office at the primary clinic enable the system to provide a high resolution 3-D image or an environment in virtual universe of metaverse enabling the interaction of the doctors with the patient.

The system enables the doctor at the primary clinic to interact with the patient at the remote location directly using a 3-D interactive Video, a 3-D projection or within a virtual environment of metaverse, to ask further questions to refine the diagnosis and arrive at an optimized diagnosis of the patient's problem.

The system also allows the doctors to discuss with the patient and arrive at a treatment option and a follow up option that the patient is comfortable with based on the final diagnosis.

The use of such a system enable doctor patient interaction for putting the patient while most of the interaction and time spent till the development of the initial diagnosis and treatment plan is handled by the natural language understanding and question generation system with AI with ML capability.

DETAILED DESCRIPTION

In many regions of the world access to medical facilities for diagnosis and treatment of diseases is limited. For example, in Australia the flying doctors have to be sent to remote locations by aircraft with the associated cost and time to check and diagnose medical problems. In some locations in Africa and India the access to and availability of doctors at remote locations are even less. This has created a need for an ability to be established that allow minimally trained doctor's assistants in remote locations, who are local and able to connect to the patients, to virtually connect patients to extract vital details and to interact with consultants and specialists, when the need arises. A method and process for providing virtual screening, by video or three dimensional (3-D) virtual image of patients implemented as a virtual universe in metaverse, for medical practitioners to interact with the patients, over the internet or as avatars in the virtual universe in metaverse, for collection of current and historic medical data, diagnosis and treatment, is disclosed. Further disclosed is the capability to use an artificial intelligence (AI) with machine learning (ML) capability (AI with ML capability hereinafter) to collect routine data from the patient, with or without help from any available minimally trained doctor's assistants, to reduce the load on the trained medical staff. Doctors are further enabled to conduct virtual visits with patients to help collect any additional medical data, establish an initial diagnosis and interacting with the patient create a treatment plan for the presented problem of the patient. The collection of patients current and historical data is the most time taking process and takes up a major portion of the Doctor's and their assistant's time and energy during any visit. Using the AI with ML capability to do the initial screening and collection of patient's non-specific medical data to be presented to the medical team before the virtual visit with the patient, will reduce the time the physicians and their team need to spend with the patient during the virtual visit. AI with ML capability can also be used to arrive at the initial diagnosis and the treatment plan to be provided to the medical team. The capability will also help minimally trained doctor's assistants and bare foot doctors at the remote clinics, at remote locations, to collect additional data of the patient by requesting clarification of the patients answers where required. Since the number and time available for the physician and physician assistants are a premium in these remote location diagnosis efforts, having an AI robot with ML capability to collect and present the routine medical information of patients will be of great import in hard to reach places and where medical facilities are difficult to get. The AI robot with ML capability will be able to interact with the patient at the remote clinic to collect the initial patient information such as weight, height, oxygen saturation of blood, blood pressure etc. if the AI with ML capability is programmed to set up the needed instrumentation for doing these tasks, with or without the help of the minimally trained doctor's assistants, at the remote clinic. Further if the AI with ML capability is enabled with natural language understanding and translation capability, the AI with ML capability can generate and ask questions to the patient and accept the natural language inputs from the patient. From these natural language interactions, the AI with ML capability will be able to identify medically relevant terminologies and their association within the natural language inputs. The AI with ML capability will also be able to screen the patient, by asking a series of inter linked questions and collecting the answers, to identify what kind of problem the patient has come to the doctor with. The AI with ML capability can then use the patient's responses and clarification answers to extract medically relevant data regarding the patient to generate the medical history of the patient and present it to the medical assistant or the medical team at the clinic. The medical history and the presented problem enabling the medical assistant, nurse practitioner or the physician to decide to collect additional data, arrive at an action plan for additional investigation and the next steps of treatment for the patient without spending too much time and effort up front with the patient, collecting current and historical medical data of the patient. The presentation itself can be made over the Video over the internet or as avatars in the virtual universe in metaverse, where the physician and assistants can directly interact with the patient, for collection of additional medical data, establishing a final diagnosis and generating the treatment plan for the patient. One of the advantages of using the AI with ML capability is the unique ability of the AI with ML capability to refine the initial interaction and the diagnostic capabilities as more and more interactions with patients and medical team happen.

Though the current application is focused on the use of the AI with ML capability for remote applications it is not to be considered limiting. AI with ML capability as developed can also be used in Doctor's offices to reduce the load on the nurses and Nurse Practitioners.

FIG. 1, 100 shows a nonlimiting system embodiment of the invention using a typical setup for the interaction of a doctor 6 with a remote patient 6a. The Set up doctor comprising a doctor's room 10 having sensors 9-1 to 9-3 for generating an image of the room for use in a virtual reality environment when such an engagement is required, a console chair 5 for the physician to use have a built in processing capability, the physician having a 3-D display terminal 1 with a console circuit box 2 and a microphone 3. The sensors 9-1 to 9-3 are linked to the console circuit box and the processing capability built into the console chair to the AI with ML capability 11 to integrate the collected data for display in the virtual reality environment and use natural language for interaction. The connection between the console circuit box and the console under the chair 5 having the processing capability is shown as wired 4. The connection to the remote patient 6a is shown as over an internet connection 7 to 7a (shown over a wireless connection 8 to 8a, though a wired connection is preferred) connecting a remote set up for the patient 6a at a remote location that is similar to that of the doctor 6, the set up comprising a patient examination room 10a with sensors 9-1a to 9-3a coupled to the condole circuit box 2a and the AI with ML capability 11a. The patient also sits on a console chair 5a having a processing capability in front of a 3-D display terminal 1a with a consol circuit box 2a and a microphone 3a. The processing capability is coupled to the console circuit box 2a and the AI with ML capability 11a using the wired connection 4a. It is to be specifically understood that this setup in FIG. 1 (100) is provided as an example only and the to the set up will depend on the design of the facility at the doctor's office and the remote location.

Figure 2:
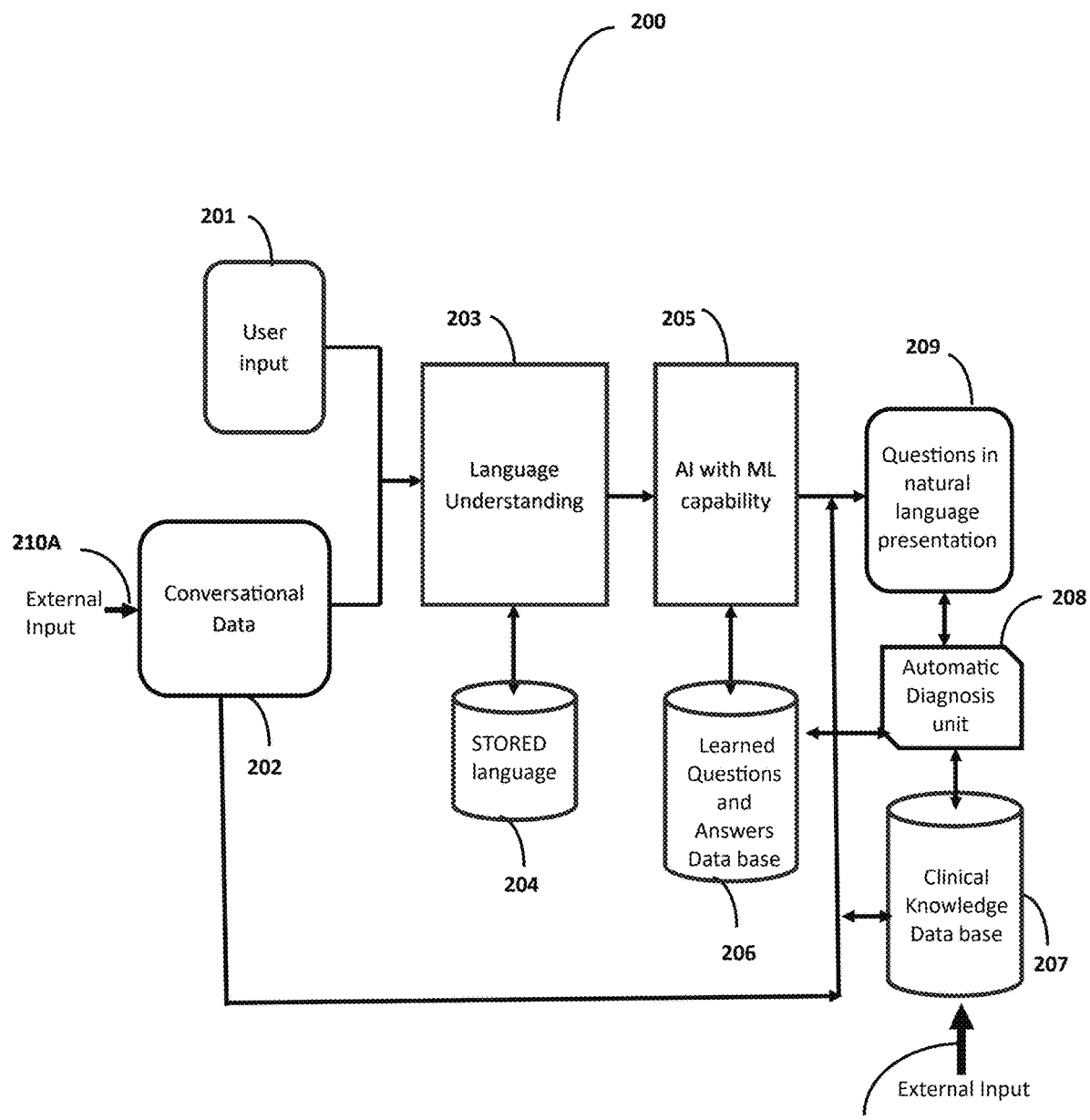
FIG. 2, (200) is an exemplary natural language understanding and question generation system with AI and ML capability for understanding the patient's problem and generating an initial diagnosis.

FIG. 2, 200 is an exemplary natural language understanding and question generation system with AI and ML capability for understanding the patient's problem and generating an initial diagnosis and an associated treatment plan. The user input via the microphone 3a in FIG. 1 is shown as incoming input, 201 which is then combined with the conversational language data, 202 supplemented by external input, 210A and previously stored conversational language data from the database 204 are used to convert the natural language input to medically understandable terminology to arrive at an understanding of the nature of the patient's medical problem at the language understanding block, 203. The natural language understood and converted medical terminology is also used to update the database, 204 for future use. The understood inputs with language stored in the database 204 is used by the AI with ML capability 205 to generate additional questions to be presented to the patient in natural language at the output questions in natural language block, 209. The AI with ML capability, 205 generated questions and the answers to them are used to refine and optimize the understanding of the patient's medical problem. The refined questions and answers enable the machine learning capability of the AI with ML capability, 205 to improve the functionality of patient interactions, using the available user inputs, 201 from patients and the previously generated questions and answers saved in a learned questions and answers database, 206. The AI with ML capability, 205 generated sets of questions and answers are also used to update the stored data in the Learned questions and answers database, 206 for providing input into the AI with ML capability, 205 as new patient interactions happen.

A clinical knowledge database 207, that is constantly updated with externally available clinical knowledge data via an external input, 210 is used to provide up to date medical knowledge to the system, 200. The information stored in the clinical knowledge database, 207 with the information contained in the updated the Learned Questions and Answers database, 206 enable the Automatic diagnosis unit enabled with AI, 208 to generate and provide an initial diagnosis and treatment plan for the patient.

Figure 3:
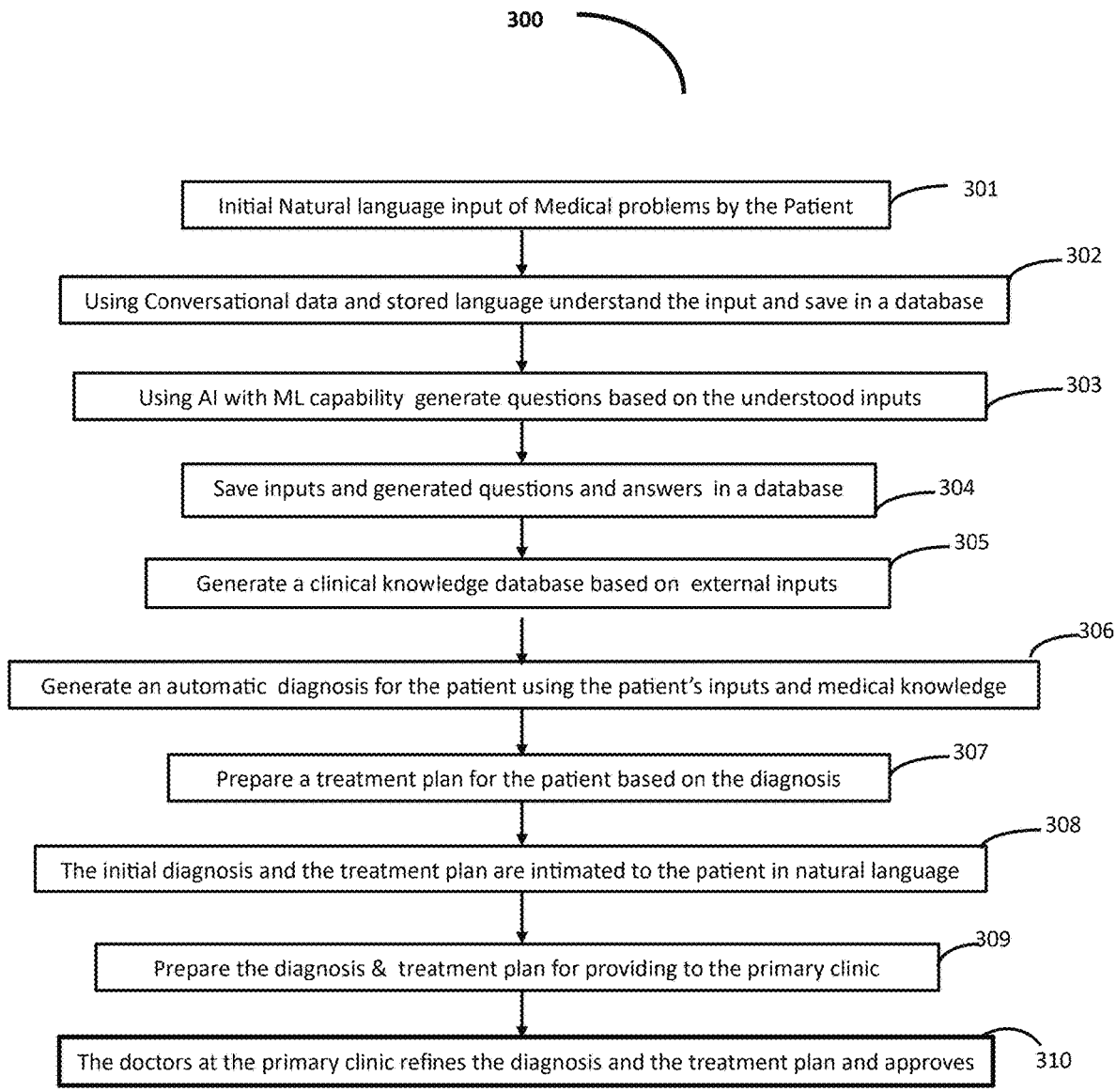
FIG. 3, (300) is an exemplary flow chart of the use of the system having AI with ML capability to generate the initial diagnosis without involving the doctors.

FIG. 3, 300 is a simplified exemplary flow chart of the operation of the system in FIG. 2 to arrive at an initial diagnosis and a treatment plan for the patient without involving a trained physician or physician assistant.

The patient arrives at the remote location 10a and is guided by a technician to the console seat 5a with the voice input 3a and visual screen and console circuit 2a. The patient then describes his personal information and the symptoms of his problem in natural language into the system, at step 301.

Using the available conversational language data from the external input 10a combined with previously stored language information in the stored language data base 204, the language understanding block 203 prepares the natural language input into a medically understandable input to be provided to the AI with ML capability 11a shown in FIG. 1 and the system block 205 of FIG. 2, at step 302.

The AI with ML capability is used to learn the medical conversion of the natural language inputs as they are presented to the AI with ML capability system block to refine the understanding of the inputs and generate additional questions to be presented to the patient to elucidate his problem for further understanding by the AI, at step 303.

The available inputs, generated questions and answers are saved and updated within a Learned questions and answers data base, 206 constantly as new patients interact with the system. The data in the database is used with the inputs from patients by the AI to improve and refine the questions generated for the patient to clarify the problem presented by the patient.

The generated questions are converted to natural conversational language and presented to the patient using the visual screen and speakers available on the console circuit 2a at the remote location, for the patient to provide answer, at step 304.

A continuously updating database of clinical knowledge, 207 is built and kept updated with external inputs and the knowledge base is made available to the system, at step 305.

Using the clinical knowledge base and the understood inputs from the questions and answers between the patient and the system saved in the database, 206, the AI based Automatic Diagnosis unit, 208 generates an initial diagnosis for the patient, at step 306.

Based on the initial diagnosis the AI based Diagnosis unit also generates a treatment plan for the patient, at step 307.

The initial diagnosis and the treatment pan are made available to the patient, at step 308

The initial diagnosis and the treatment plan are made ready for transfer to the doctors at the primary clinic, at step 309

Figure 4:
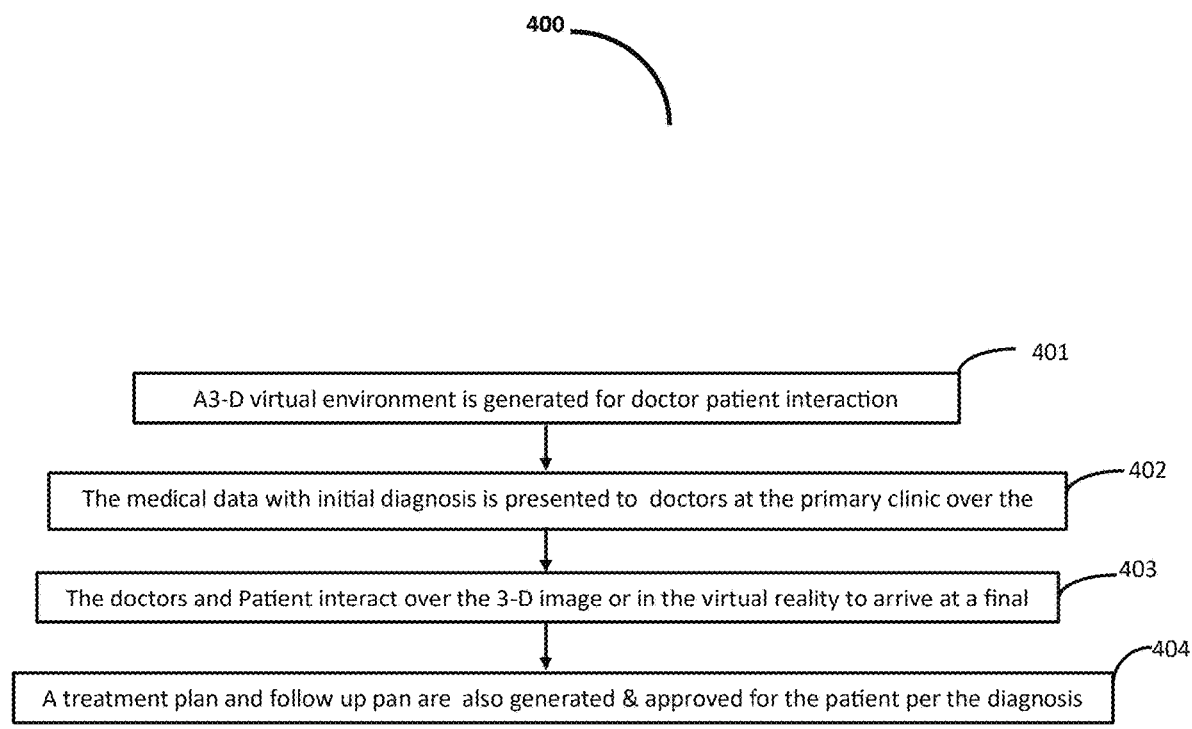
FIG. 4 (400) is an exemplary flow chart of the capability developed as an embodiment of the current invention for remote doctor patient interaction either via high resolution 3-D images or within a virtual reality environment to finalize a diagnosis and treatment plan with follow-up.

The doctors can the approve the diagnosis and treatment plan or connect to the patient over the network to ask further clarifications to the patient and refine the diagnosis and treatment plan at step 310, FIG. 4, 400 is an exemplary flow chart of the interaction between the doctors at the primary clinic and the patient at the remote location after they have received the initial diagnosis and the treatment plan developed by the AI based diagnosis unit. At the remote location.

A 3-D image or a virtual environment in metaverse is generated with the patient sitting on the console chair 5a in front of the display console circuit 2a with the microphone 3a at the remote location and the doctor at the primary clinic on in front of the console with the communication capability 5 using the 3-D data collected by the sensors 9-1 to 9-3 and 9a-1 to 9a-3 at the two locations. The system enable the doctors to interact with the patient in the virtual environment of metaverse or 3-D display. at step 401.

The diagnosis and treatment plan developed automatically using the remote system having AI with ML capability is sent over the internet connection and presented to the doctors at the primary clinic for review, at step 402.

The doctors at the primary clinic interact with the patient to refine the initial diagnosis by asking additional questions and explain the final diagnosis and the treatment plan to the patient over the 3-D display or within the virtual environment of the metaverse, at step 403. A diagnosis and a treatment plan as well as plan for follow-up and review are agreed between the patient and the doctor during the interaction, at step 404.

The invention claimed is:

1. A system, the system comprising:
a first system module at a remote location, wherein the first system module comprises at least one processing device, and wherein the remote location has no direct access to doctors;
a second system module at a doctors' office location at a primary clinic, wherein the second system module comprises at least one processing device, and wherein the doctors' office location has at least a doctor;
a communication connection between the first system module at the remote location and second system module at the doctors' office location;
a continuously updating medical knowledge database coupled to the first and second system modules;
the first system module at the remote location further comprising a first set of sensors configured for capturing a first image data of a volume of the remote location;
the second system module at the doctors' office location at the primary clinic further comprising a second set of sensors configured for capturing a second image data of a volume of the doctors' office location;
the first system module that captured the first image data of the volume of the remote location comprising:
a first console circuit box accessible by a patient with a medical problem;
a first processing capability linked to the first set of sensors and coupled to a first voice input and a first display capability;
a natural language processing capability;
a first artificial intelligence with machine learning (AI with ML) capability coupled to the first console circuit box;
wherein the first AI with ML capability is also linked to the continuously updating medical knowledge database coupled to the first and second system modules;
the second system module that captured the second image data of a volume of the doctors' office location comprising:
a second console box accessible by the doctors;
a second processing capability linked to the second set of sensors and coupled to a second voice input and a second display capability;

a second artificial intelligence with machine learning (AI with ML) capability coupled to the second console circuit box;
   wherein the second AI with ML capability is also linked to the continuously updating medical knowledge database coupled to the first and second system modules;
wherein the first and the second image data is configured to be combined to generate, by the first and second system modules, a three dimensional (3-D) image data using the processing power available within the system;
wherein the generated 3-D image data is configured for generating a virtual environment in metaverse;
the first system module is configured to receive natural language inputs from the at least the patient via the first voice input relating vital details of the patient and the patient's medical problem and using the at least the first processing capability and the AI with ML capability coupled to the medical knowledge database, generate medically relevant questions to be answered by the at least the patient, to arrive at an understanding of the medical problem of the patient; and
the first system module, based on the understanding and further using a diagnostic capability coupled to the first AI with ML capability and inputs from the medical knowledge database, is configured to generate a preliminary diagnosis and a preliminary treatment plan for the medical problem of the patient at remote location;
the first system module further enabled to transmit the generated preliminary diagnosis and a treatment plan for the medical problem of the patient at the remote location to the second system module at the doctors' office location over the communication connection between the first system module at the remote location and the second system module at the doctors' office location for enable the at least the doctor to review the preliminary diagnosis and the preliminary treatment plan at the doctors' office location for review; and
the first and second system modules are configured to avatars representing the patient with a medical problem, at the remote location, and the at least the doctor, at the doctor's office location within the virtual environment in metaverse configured to interact and finalize a diagnosis and a treatment plan for the patient.

2. The system of claim 1, wherein the second system module at the doctors' office location configure to receive the preliminary diagnosis and the primary treatment plan from the first system module for the medical problem of the patient at remote location;
   the second system module comprising:
      a second set of sensors for capturing a second image data of a volume of the doctor's office location comprising:
      a display terminal configured to enable the at least the doctor to review the received the preliminary diagnosis and the preliminary treatment plan;
      a second console circuit box comprising:
      a second processing capability linked to the second set of sensors and coupled to a second voice input and a display capability;
      a second artificial intelligence with machine learning (AI with ML) capability coupled to the first console circuit box;
         wherein the first AI with ML capability is also linked to the continuously updating medical knowledge database coupled to the first and second system modules to enable the at least the doctor to review the preliminary diagnosis and the preliminary treatment plan received with all updated medical knowledge.

3. The system of claim 2, wherein the sensors covering the patient's room at the remote location and the doctor's office at the primary clinic enable the system to provide a high resolution 3-D image for interaction between the at least doctor and the patient in an environment in virtual universe of metaverse enabling the at least the doctor to ask further questions to refine the preliminary diagnosis and arrive at an optimized diagnosis and discuss with the patient to arrive at a treatment option for the patient's problem that the patient is comfortable with as avatars in the metaverse.

4. The system of claim 2, wherein the 3-D image data is further enabled to provide a 3-D display on the display screens in the remote location and the doctors' office location.

5. The system of claim 1, wherein the first system module at the remote location is configured to generate the initial diagnosis and the initial treatment plan, for the patient with the medical problem, at the remote location without involvement of doctors thereby saving time and effort by the doctors at the doctors office location.

* * * * *